(12) United States Patent
Von-Wilmowsky et al.

(10) Patent No.: US 10,384,762 B2
(45) Date of Patent: Aug. 20, 2019

(54) DEFLECTOR ASSEMBLY FOR AN AIRCRAFT

(71) Applicant: AIRBUS HELICOPTERS DEUTSCHLAND GMBH, Donauworth (DE)

(72) Inventors: Kaspar Von-Wilmowsky, Donauworth (DE); Gerald Ernst, Donauworth (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 157 days.

(21) Appl. No.: 15/236,565

(22) Filed: Aug. 15, 2016

(65) Prior Publication Data

US 2017/0057617 A1 Mar. 2, 2017

(30) Foreign Application Priority Data

Aug. 31, 2015 (EP) .................................... 15400039

(51) Int. Cl.
*B64C 7/00* (2006.01)
*B64C 1/22* (2006.01)
(Continued)

(52) U.S. Cl.
CPC ................. *B64C 7/00* (2013.01); *B64C 1/22* (2013.01); *B64C 27/00* (2013.01); *B64D 1/22* (2013.01)

(58) Field of Classification Search
CPC ...... B64D 1/22; B64D 9/00; B64C 2025/325; B64C 27/006; B60R 9/02; F16C 29/005;
(Continued)

(56) References Cited

U.S. PATENT DOCUMENTS 1,362,521 A * 12/1920 Zadora .................. F16L 37/248
285/361
1,645,747 A * 10/1927 Fry ......................... B66C 23/66
212/232
(Continued)

FOREIGN PATENT DOCUMENTS

GB 2303837 3/1997
GB 2303837 A 3/1997
(Continued)

OTHER PUBLICATIONS

European Search Report for European Application No. 15400039, Completed by the European Patent Office dated Jan. 12, 2016, 4 pages.
(Continued)

*Primary Examiner* — Medhat Badawi
*Assistant Examiner* — Christopher D Hutchens
(74) *Attorney, Agent, or Firm* — Brooks Kushman P.C.

(57) ABSTRACT

A deflector assembly for the rope/cable hanging from a hoist mounted on an aircraft (A). The deflector assembly has an adjoined anchorage that includes a socket face that internally has a sliding bearing in which is housed an innermost end, so that the innermost end is slidably guided relative to the adjoined anchorage to have one degree of freedom along a linear translation axis (LT). A remote anchorage has a support bracket for demountably mounting the remote anchorage to the fuselage. The rotorcraft can be chosen among: helicopters, hybrid rotary aircrafts, UAV rotorcrafts and inhabitable rotorcrafts including remote piloting functions.

16 Claims, 6 Drawing Sheets

(51) Int. Cl.
*B64D 1/22* (2006.01)
*B64C 27/00* (2006.01)

(58) Field of Classification Search
CPC .............. Y10T 403/453; Y10T 403/451; Y10T 403/454; Y10T 403/455; Y10T 403/457; Y10T 403/45; Y10T 403/32983
USPC ................. 403/165, 298, 378, 359, 379.3
See application file for complete search history.

(56) References Cited

U.S. PATENT DOCUMENTS

| | | | | |
|---|---|---|---|---|
| 1,891,188 | A * | 12/1932 | Stalb, Jr. ............... | B64C 25/52 244/108 |
| 2,508,832 | A * | 5/1950 | McAninch ............... | F16D 1/04 403/355 |
| 2,937,042 | A * | 5/1960 | Wilder, Jr. ............... | F16D 1/02 403/354 |
| 2,984,437 | A * | 5/1961 | Jensen ............... | B64C 25/06 244/104 R |
| 3,193,221 | A * | 7/1965 | Parshley ............... | B64C 25/52 244/100 R |
| 3,323,756 | A * | 6/1967 | Mapes, Jr. ............... | B64D 1/22 244/3 |
| 3,823,901 | A | 7/1974 | Holmes et al. | |
| 4,165,892 | A * | 8/1979 | Piatek ............... | F16B 7/0413 285/111 |
| 5,243,874 | A * | 9/1993 | Wolfe ............... | B29C 45/14754 280/775 |
| 5,950,252 | A * | 9/1999 | Fettes ............... | E04H 4/084 4/498 |
| 6,287,042 | B1 * | 9/2001 | Eriksson ............... | E04H 12/32 116/173 |
| 6,488,236 | B2 * | 12/2002 | Landry ............... | B64D 1/22 244/137.1 |
| 6,872,026 | B2 * | 3/2005 | Petner ............... | B25G 3/26 15/145 |
| 8,567,710 | B2 * | 10/2013 | Hayashi ............... | B64C 25/52 244/108 |
| 8,662,794 | B2 * | 3/2014 | Atchley ............... | E02D 13/10 403/378 |
| 2006/0237558 | A1 | 10/2006 | Lee | |
| 2013/0270393 | A1 * | 10/2013 | Shrapnel ............... | B64D 1/22 244/137.4 |
| 2016/0200445 | A1 | 7/2016 | Jones et al. | |
| 2017/0144741 | A1 * | 5/2017 | Wang ............... | B64C 39/028 |

FOREIGN PATENT DOCUMENTS

| | | |
|---|---|---|
| JP | 3084369 | 9/2000 |
| RU | 164934 U1 | 2/2016 |

OTHER PUBLICATIONS

Website http://img.scoop.it/TCVBdhyxgEtt03UU3VKo_3kes5yE2Br8B0LnubnjJ88 Picture example of a typical deflector assembly for a side door hoist, Retrieved on Feb. 16, 2016, 1 Page.
Russian Search Report for Russian Application No. 2016149553, dated Sep. 19, 2017, 2 Pages.

* cited by examiner

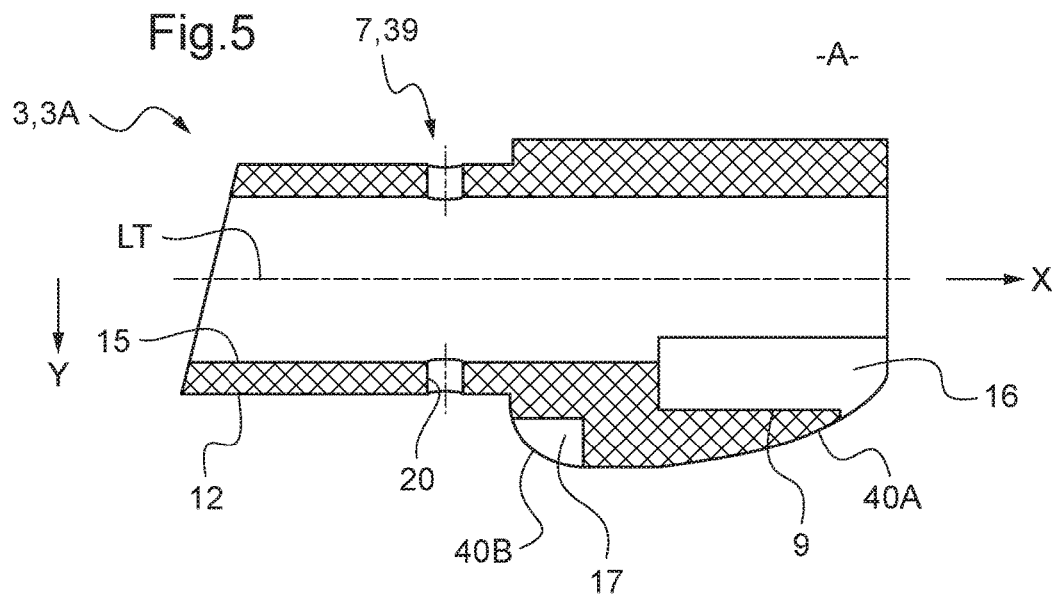
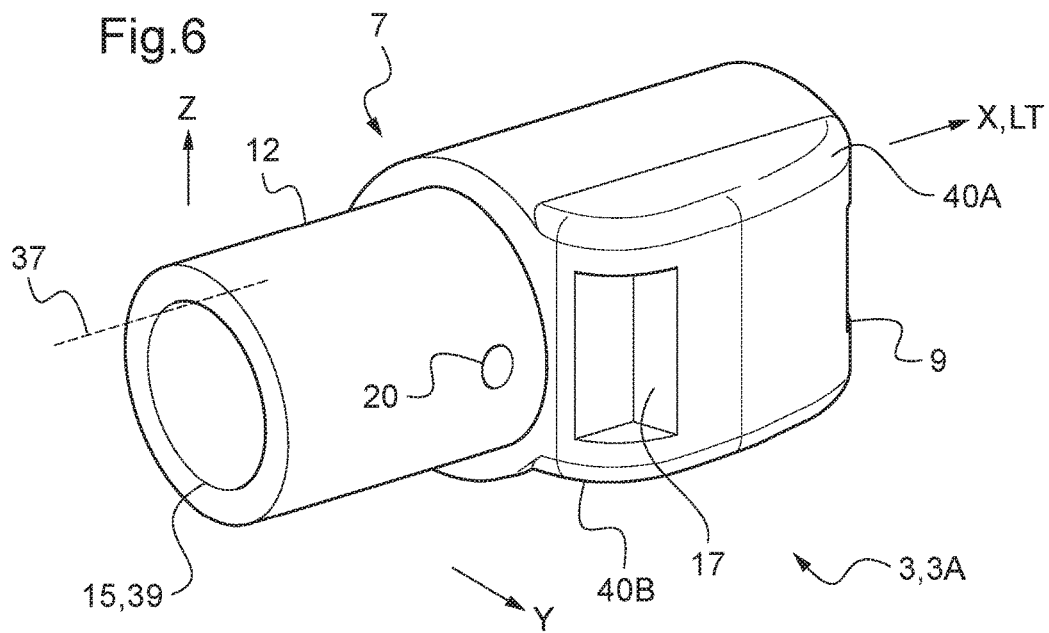

DEFLECTOR ASSEMBLY FOR AN AIRCRAFT

CROSS REFERENCE TO RELATED APPLICATION

This application claims priority to European patent application No. EP 15400039.2, filed Aug. 31, 2015, the disclosure of which is incorporated in its entirety by reference herein.

BACKGROUND OF THE INVENTION

(1) Field of the Invention

The invention relates to a deflector assembly for an aircraft, and an aircraft including such a deflector assembly.

(2) Description of Related Art

For cargo, rescue, tactical or the like missions, some aircrafts are provided with hoists. Classically, the hoist has a gallows body secured to the fuselage of the aircraft. A winch mechanism is fixed to the gallows body and a rope/cable attached to the winch mechanism so as to be unwind from or wind into the winch mechanism to respectively descend or ascend a load carrying harness or the like secured to the rope/cable. Thus, Human persons and/or objects can be stowed by the hoist when attached to the load carrying harness.

Thanks to their hovering ability, the rotary wing aircrafts are appreciated for such cargo, rescue, tactical or the like missions. In many rotary wing aircrafts, the hoist is located above an access opening provided in the fuselage. This access opening allows entering inside and exiting outside the fuselage, for Human persons or objects. Depending on requirements of the mission and on the architecture of these rotary wing aircrafts, the opening access maybe a side door, a rear door or movable panel, a floor trap or the like.

So as to ease entering inside and exiting outside the fuselage through the access opening, some rotary wing aircrafts include a boarding step located below the lower sill of the opening access. When a hoist hangs over the access opening, the rope may interfere with the boarding step.

Therefore, hoist rope deflectors are sometimes disposed in the vicinity of protuberant bodies such as boarding steps, e.g. in rotary wings aircrafts, so that the hoist rope/cable may jam with one protuberant body during service. Jamming of the rope/cable during service is not admissible, because the rope/cable could break subsequently and therefore the stowed persons or objects may be exposed to danger. It is common use to provide the aircraft with a deflector assembly, aiming to avoid such inconveniences.

But as the deflector assembly is usually rigidly fixed to the fuselage, no relative movement between fuselage and the deflector assembly is possible. In that condition, all loads coming from vibration and movements in the hoist are transferred to the fuselage when the rope/cable are in contact with the deflector assembly.

Meanwhile, since cargo, rescue, tactical or the like aircrafts shall readily be adapted to day-to-day distinct missions, the deflector assembly shall be easily, quickly and smoothly detached from the fuselage, when a forthcoming mission makes it preferable to. This is specifically the case for rotary wing aircrafts, which are frequently modified, improved or adjusted depending upon mission requirements.

Also, specifically for rotary wing aircrafts, any additional structure component to be mounted on the aircraft, such as a deflector assembly, shall be as light as possible, since weight constraints are utterly strict for these aircrafts, e.g. in comparison with jetliners or cargo planes.

Furthermore, any additional component to be mounted on the aircraft, such as a deflector assembly, shall be as reliable, structurally simple and thrifty as possible. Such constraints are utterly strict for rotary wing aircrafts.

Notably, the invention aims to overcome these drawbacks.

The following documents have been considered in the technical domain of protection against hanging over rope/cable interference with aircrafts outer parts that forms protuberant bodies. Generally speaking, the protuberant bodies concerned by the invention are chosen e.g. among: boarding step, landing gear fender, movable panel sill, floor trap edge and onboard equipment cache.

The document JP 3084369 describes damage prevention equipment having a pivotable cylindrical guard roll arranged along with metal mounting boards and a mounting board attached to a side surface of a helicopter. The mounting board is fixed along with a camber part of the helicopter. The mounting board has a pivotable cylindrical guard roll arranged substantially in parallel with a mounting board. The both ends of a cylindrical guard roll are attached to the roll supporting part fixed to the mounting board pivotable, and to a mounting board. An auxiliary roll contacts the side surface of a cylindrical guard roll and may rotate with a cylindrical roll. A barrel wall of the cylindrical guard roll consists of metal internal layers and an outer layer made of a synthetic resin.

The document U.S. Pat. No. 8,567,710 describes a protection frame to prevent a cable from being damaged by rubbing against a helicopter. The protection frame is installed on a side surface of a body of the helicopter, below a winch. A supporting groove is formed on the protection frame and a slide-contact body of a cylindrical shape is rotatably fitted in the support groove. Both ends of the slide-contact body are formed to recession-like or projection-like taper shapes and are aligned.

A typical example of deflector assembly for a side door hoist as aimed by the invention, installed for jamming protection of a boarding step between a landing gear fender and the fuselage of a rotary wing aircraft, is shown at: http://img.scoop.it/
TCVBdhyxgEtt03UU3VKo_3kes5yE2Br8B0LnubnjJ88.
The documents U.S. Pat. No. 3,823,901, GB 2303837 and US 2006/237558 were also considered.

In this context, the invention concerns a deflector assembly with notably the features of claim 1, and an aircraft with the features of claim 9.

BRIEF SUMMARY OF THE INVENTION

The invention has the advantage that the deflector assembly is very easily mounted and demounted compared with known solutions. Therefore aerodynamic drag can be reduced during service, if the aircraft just don't has to perform a SAR-mission.

Besides, the invention allows load-absorbing movements of the deflector assembly e.g. in the flight direction to prevent high loads from occurring between the deflector assembly and the boarding step. Therefore a lighter design of the boarding step can be performed.

Also, the invention needs only few parts and is cost effective based on the use of semi-finished products like tubes.

According to the invention, an object is a deflector assembly for an aircraft); the deflector assembly being able to be mounted on a fuselage of the aircraft so as to protect a protuberant body against contact adverse reaction from an external item outside the fuselage; the protuberant body being mounted on and extending outwards the fuselage;

This deflector assembly comprises at least:
one adjoined anchorage able to be rigidly secured to the protuberant body;
one remote anchorage able to be secured to the fuselage; and
one deflector ramp, extending from the adjoined anchorage and towards the remote deflector anchorage along a longitudinal direction of the deflector assembly.
an innermost end of the deflector ramp that cooperates with the adjoined anchorage and
an outermost end of the deflector ramp that cooperates with the remote deflector anchorage; the deflector ramp having a central oblique section that is secant to a longitudinal direction of the deflector assembly and that extends with an oblique angle relative to the longitudinal direction, to act as a sliding guide for the external item.

In an embodiment, the adjoined anchorage includes a socket face that internally has a sliding bearing in which is housed the innermost end; the sliding bearing has a linear translation axis along which the innermost end is slidably guided relative to the adjoined anchorage to have one degree of freedom along the linear translation axis; the remote anchorage having a support bracket for demountably mounting the remote anchorage to the fuselage.

In an embodiment, the innermost end has a slot hole extended along the linear translation axis; the adjoined anchorage has a traversing bore radially passing from the sliding bearing to an adjunctive arrangement outside the socket face; the adjunctive arrangement being able to complementary fit into a support sheath of the protuberant body; the deflector assembly including a binding axis passing through the slot hole and through the traversing bore, the binding axis being able to be rigidly secured in a drill hole (18) of the support sheath, for having the adjoined anchorage fixedly hold into the support sheath and the innermost end slidably guided along the linear translation axis.

In an embodiment, the slot hole has a predetermined dimension along the linear translation axis that correspondingly limits the freedom in translation of the innermost end relative to the adjoined anchorage.

In an embodiment, the linear translation axis of the sliding bearing is parallel to the longitudinal direction.

In an embodiment, the adjoined anchorage has an outer recess in the socket face and a front beam; the front beam being received into the outer recess flush with the socket face; the front beam being arranged to be able to locally cover a support sheath and a step plate of the protuberant body, so that the front beam is outwardly leveled with the socket face.

In an embodiment, the socket face has at least one rounded frontage and is a one-piece member made of a single material chosen among one of: die cast metal, machined metal, machined synthetic resin, molded synthetic resin, unitary formed composite; the socket face includes at least one sliding bearing.

In an embodiment, in the deflector assembly, a frontage cam track is fixedly secured to the deflector ramp and is locally covering the central oblique section and partly the innermost end of the deflector ramp; the socket face has a clearance cavity extending along the linear translation axis for receiving an end portion of the frontage cam track aside the innermost end; the end portion of the frontage cam track being locally housed freely into the clearance cavity, so that when the deflector ramp translates relative to the socket face, the ending portion of the frontage cam track respectively slides inside the clearance cavity.

In an embodiment, the deflector ramp has a tube shaped section, integrally formed with the innermost end parallel with the linear translation axis, the central oblique section extending with the oblique angle being an acute angle and the outermost end parallel with the linear translation axis.

In an embodiment, the remote deflector anchorage includes in the support bracket a rotational bushing, so that the outermost end is pivotably secured to the fuselage, with a relative degree of rotational freedom.

Another object of the invention is an aircraft that includes at least one deflector assembly as exposed above and at least one protuberant body. For instance, at least one protuberant body is attached to at least one deflector assembly and is being chosen among: boarding step, landing gear fender, movable panel sill, floor trap edge and onboard equipment cache.

In an embodiment, at least one protuberant body has attached thereto, two deflector assemblies, one deflector assembly—called first deflector assembly—being besides a first side end of the protuberant body and another deflector assembly—called second deflector assembly—being besides a second side end of the protuberant body.

In an embodiment, at least one protuberant body has a mount device including at least one support sheath able to cooperate with the deflector assembly and one attachment organ through which the protuberant body is demountably mounted on the fuselage; the support sheath having a drill hole facing the slot hole and the traversing bore.

In an embodiment, at least one protuberant body is extended parallel to an anteroposterior plane of the aircraft; a deflector assembly being a heading deflector assembly and having the linear translation axis extending parallel the anteroposterior plane; the oblique section of the deflector ramp being transverse to the anteroposterior plane, towards the anteroposterior plane longitudinally from aft to fore along a forward cruise axis of the aircraft.

In an embodiment, at least one deflector assembly is located under a movable panel of the fuselage and in overhanging concordance with a suspension point of the fuselage to which the external item hangs over; at least one deflector assembly being aside of the suspension point along a forward cruise axis of the aircraft.

In an embodiment, the aircraft is a rotorcraft and the longitudinal direction of at least one deflector assembly is chosen to extend along one of: a cruise forward axis of the aircraft and a transverse axis orthogonal to the cruise forward axis of the aircraft and to an anteposterior plane of the aircraft.

The rotorcraft can be chosen among: helicopters, hybrid rotary aircrafts; UAV rotorcrafts and inhabitable rotorcrafts including remote piloting functions.

BRIEF DESCRIPTION OF THE SEVERAL VIEWS OF THE DRAWINGS

A short description of the drawings follows.

Presently preferred embodiments of the invention are presented in the following description with reference to the attached drawings.

FIG. 5 is a cutaway lateral view of a adjoined anchorage of a fore deflector assembly as per the invention.

FIG. 6 is a perspective front and lateral view of an adjoined anchorage of a fore deflector assembly as per the invention.

DETAILED DESCRIPTION OF THE INVENTION

Some figures show three mutually orthogonal directions X, Y and Z. The directions X, Y and Z together define a referential XYZ.

A reference direction X referred to as being longitudinal corresponds to the length dimension and the forward cruise axis of the aircrafts described. Terms such as front/rear or fore/aft are relative thereto. The longitudinal direction X is deemed to be parallel to a roll axis of the aircraft.

Another direction Y, said to be transverse, corresponds to the thickness or lateral dimension of the structures described.

The dimensions X and Y define together the anteroposterior plane XZ of the aircraft. The anteroposterior plane AP of a rotorcraft is the upwards and transversally median plane that divides this rotorcraft in two lateral halves, i.e. the port side and the starboard side or left and right sides.

The terms side or left/right or port/starboard are relative to the transverse direction Y. For instance, a transverse axis orthogonal to the anteroposterior plane XZ is considered as being mainly directed along this direction Y. This direction Y is deemed here as being parallel to a pitch axis of the aircraft.

Another direction Z is referred to as the elevation or upwards direction. In level flight of an aircraft, the altitude or ground distance is along the direction Z. The direction Z corresponds to the radial length/height of the structures described. Here, the direction Z is deemed as being parallel to a yaw axis of the aircraft.

Figure 1:
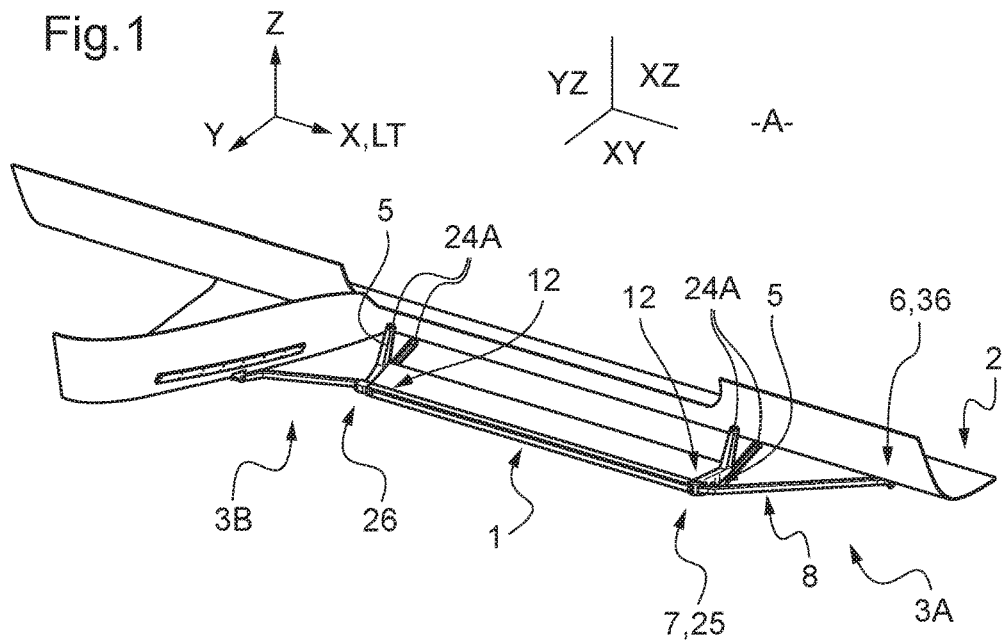
FIG. 1 is a schematic perspective front and lateral view of an aircraft of the prior art, equipped with a classical deflector at each longitudinal side end of a boarding step.

On the FIG. 1, an aircraft A is illustrated, that is a rotorcraft. For instance, the aircraft A of other embodiments of the invention is chosen among various other aircrafts capable of cargo, rescue (e.g. SAR), tactical or the like missions, and of being equipped with a hoist. For instance, these embodiments consist of fixed wings or rotary wing aircrafts like helicopters, hybrid rotary wing aircrafts; UAV rotorcrafts and inhabitable rotorcrafts including remote piloting functions.

The aircraft A includes at least one protuberant body 1 and a fuselage 2, to which is directly or indirectly attached the protuberant body 1. The body 1 is called protuberant since this body 1 extends outwards the fuselage 2.

Figure 2:
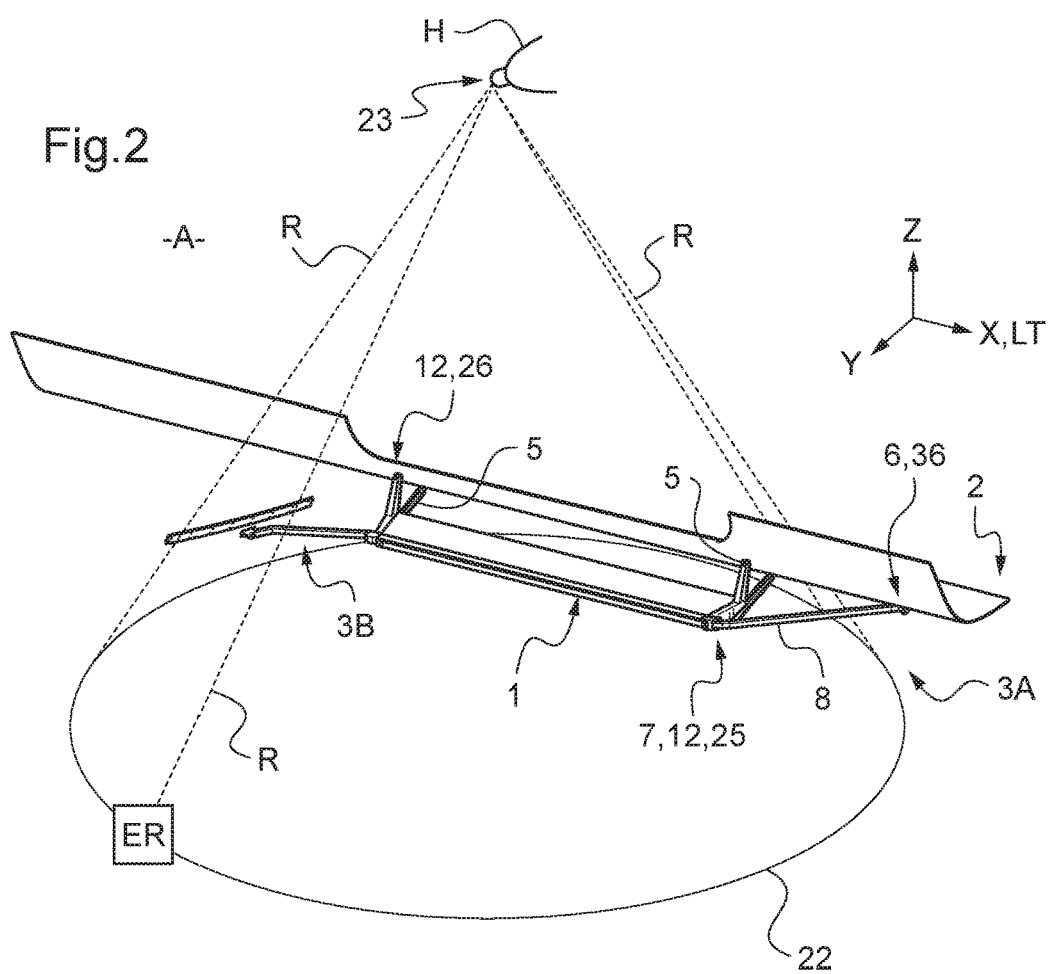
FIG. 2 is a perspective front and lateral view of the aircraft of FIG. 1, with a hoist and a rope/cable attached to the fuselage.

As shown on FIG. 2, the aircraft A includes at least one hoist H. The hoist H classically has a gallows body secured to a fuselage of 2 the aircraft A. A winch mechanism is fixed to the gallows body and a rope/cable R is attached to the winch mechanism, so as to be unwind from or wind into the winch mechanism. This allows for respectively descending or ascending a load carrying harness or the like, secured to the rope/cable R. Thus, the hoist H allows Human persons and/or objects to be stowed when attached to the load carrying harness.

As shown on FIG. 2, during service of the aircraft A, the rope R can move within a hanging cone 22 extended from a suspension point 23 of the rope R (to the gallows body) downwards relative to the fuselage 2. On FIG. 2, the hanging cone 22 has an angle of e.g. about 30°.

The aircraft A of FIG. 1 or 2 has one protuberant body 1 has attached thereto and two deflector assemblies 3A-3B (while any protuberant body 1 is generally designated by reference 3). In the shown embodiments, the protuberant body 1 is a boarding step, but other embodiments include distinct/a plurality of protuberant bodies 1.

On FIG. 2, the deflector assemblies 3A-3B are located under a movable panel of the fuselage 2 and in overhanging concordance with a suspension point 23 of the fuselage 2 to which an external item ER hangs over. These deflector assemblies 3A-3B are aside of the suspension point 23 along a forward cruise axis or direction X of the aircraft A.

One of the deflector assemblies 3—called first deflector assembly 3A—is besides a first side end 25 of the protuberant body 1 along the direction X. Another of the deflector assemblies 3—called second deflector assembly 3B—is besides a second side end 26 of the protuberant body 1 along the direction X.

On FIG. 1 or 2, the first deflector assembly 3A is fore the protuberant body 1 and the second deflector assembly 3B is aft, along the direction X. Here, the first deflector assembly 3A is mounted between the protuberant body 1 and the skin of the fuselage 2. The second deflector assembly 3B is mounted between the protuberant body 1 and a landing gear fender itself mounted on the fuselage 2 of the aircraft A.

The first deflector assembly 3A is heading and has a linear translation axis LT extending parallel the anteroposterior plane XZ. An oblique section 38 of a deflector ramp 8 of the first deflector assembly 3A is transverse to the anteroposterior plane XZ, towards the anteroposterior plane XZ longitudinally from aft to fore along the forward cruise axis of the aircraft A.

On FIG. 1 or 2, the protuberant body 1 has a pair of mount devices 5 respectively at the first side end 25 and at the second side end 26. Each mount device 5 includes at least one support sheath 12. Here, each sheath 12 is able to cooperate with one respective deflector assembly 3A-3B. Each mount device 5 includes at least one attachment organ 24A through which the protuberant body 1 is demountably mounted on the fuselage 2.

On examples of FIG. 1 or 2, the protuberant body 1 extends parallel to the anteroposterior plane XZ of the aircraft A, and slightly along the longitudinal direction X. On other examples, the protuberant body 1 is e.g. extended perpendicular to the anteroposterior plane XZ.

This deflector assembly 3A comprises at least:
  one adjoined anchorage 7 able to be rigidly secured to the protuberant body 1 at the end 25;

one remote anchorage 6 able to be secured to the fuselage 2 by an attachment organ 24B; and one deflector ramp 8, extending from the adjoined anchorage 7 and towards the remote deflector anchorage 6, along the longitudinal direction X.

In the deflector assembly 3A, an innermost end 37 of the deflector ramp 8 cooperates with the adjoined anchorage 7 and an outermost end 36 of the deflector ramp 8 cooperates with the remote deflector anchorage 6.

Also in the deflector assembly 3A, the deflector ramp 8 has a central oblique section 38 that extends along an axis 38L that is secant to, or intersecting, the longitudinal direction X of the deflector assembly 3A and that extends with an oblique angle SG (FIG. 3) relative to the longitudinal direction X, in a plane orthogonal to the anteroposterior plane XZ, to act as a sliding guide for the external item ER.

From the above, it is clear that each deflector assembly 3 is mounted on the fuselage 2 so as to protect the proximal protuberant body 1 against adverse contact reaction—like jamming—from the external item ER and/or of the rope R outside the fuselage 2.

Figure 3:
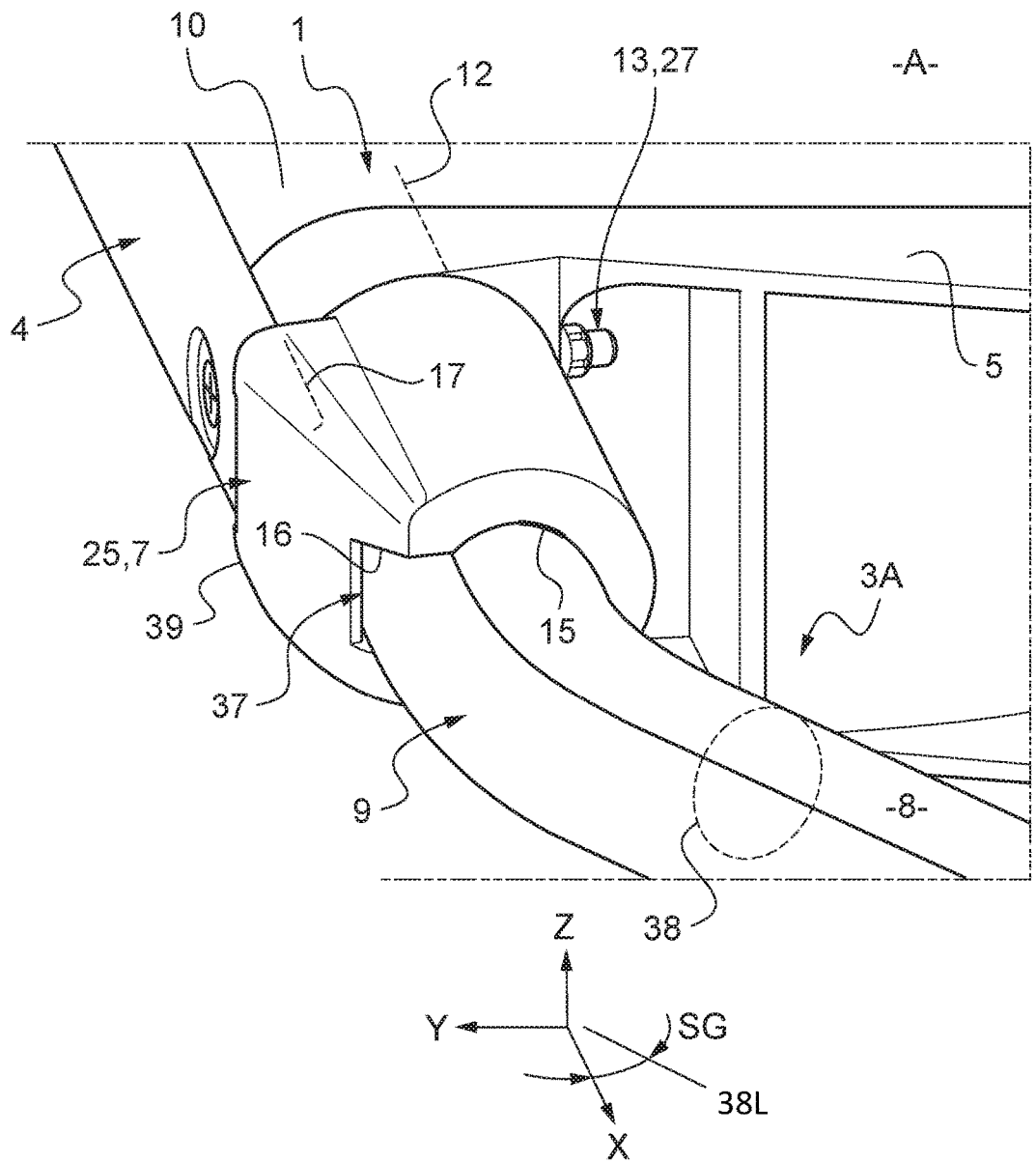
FIG. 3 is a part perspective front and lateral view of a mount device and of a fore deflector assembly as per the invention.
Figure 4:
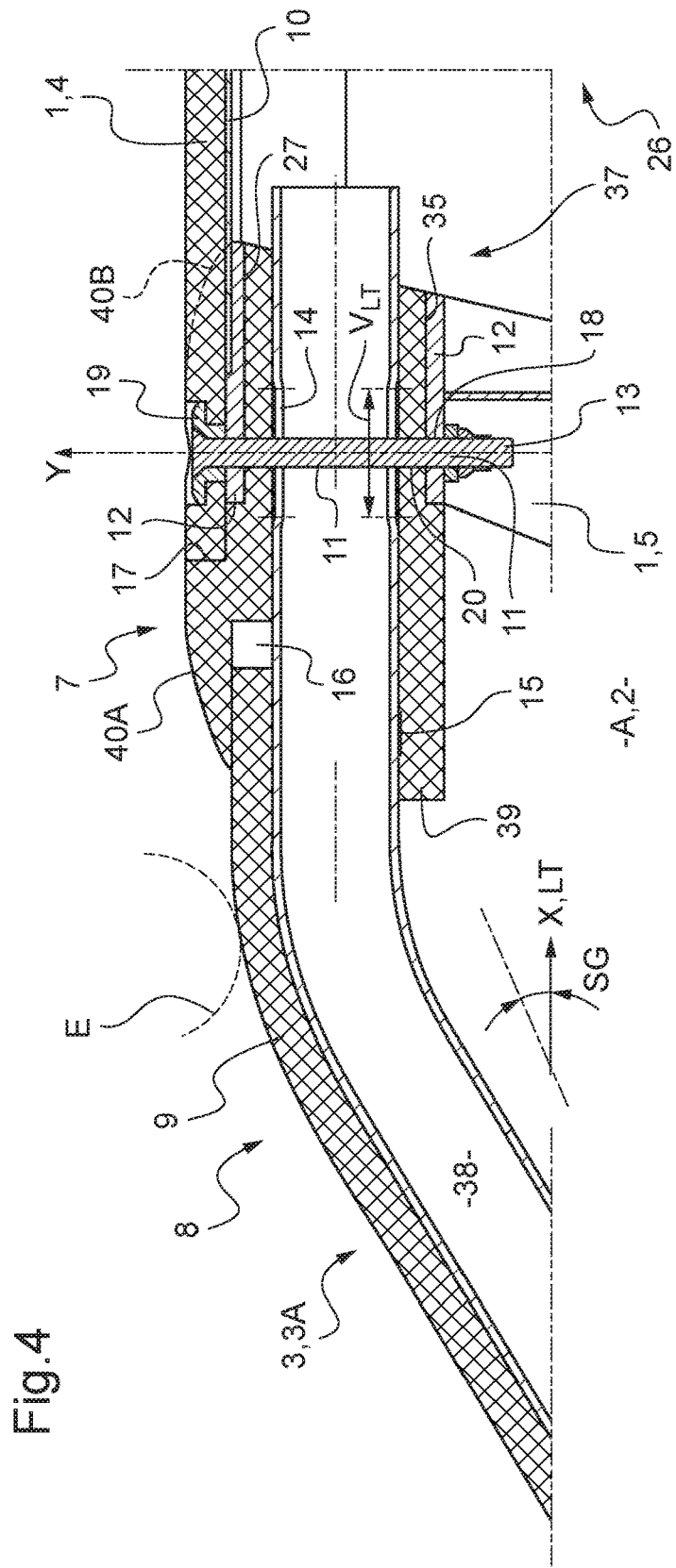
FIG. 4 is a part cutaway lateral view of a mount device and of a fore deflector assembly as per the invention.
Figure 7:
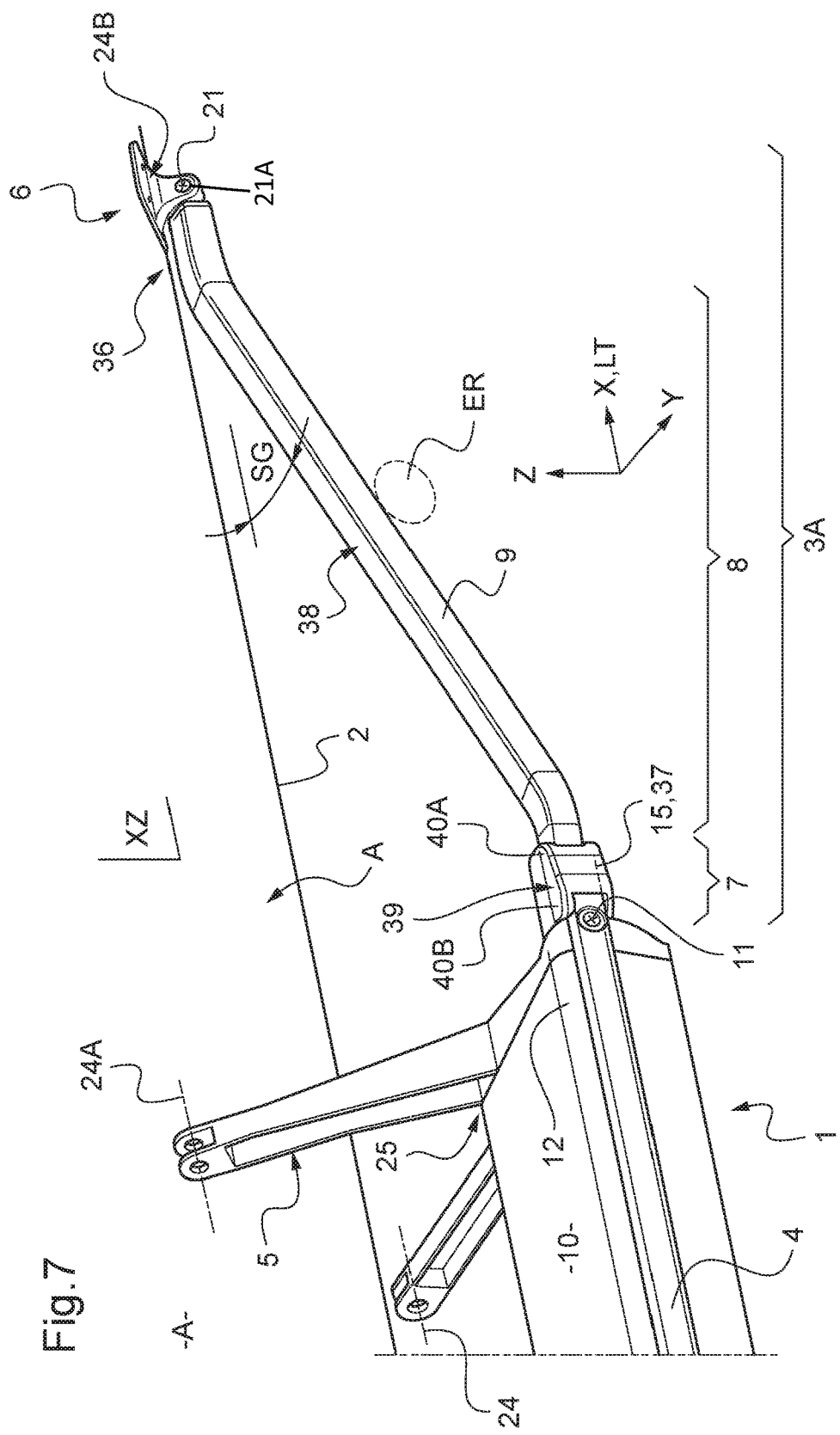
FIG. 7 is a perspective front and lateral view of a fore deflector assembly and of a protuberant body step as per the invention.
Figure 8:
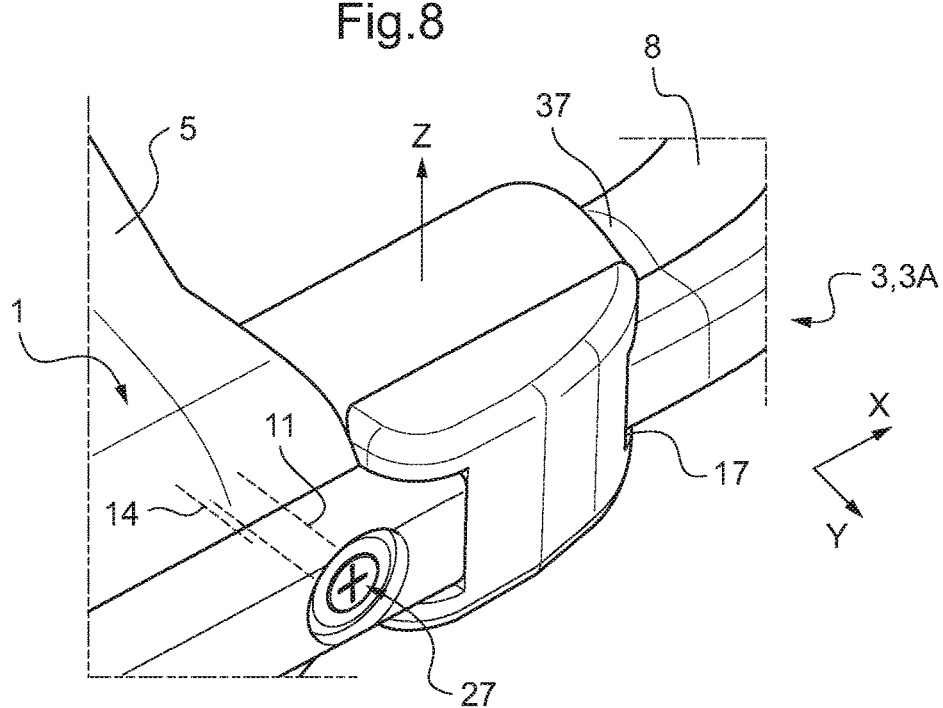
FIG. 8 is a perspective front and lateral view of an adjoined anchorage as per the invention when assembled to a deflector ramp and to a protuberant body step as per the invention.

More detailed description refers to FIGS. 3-9, and specially FIGS. 4 and 7.

On FIG. 7, the remote anchorage 6 has a support bracket 21 for demountably mounting the remote anchorage 6 to the fuselage 2.

On FIG. 4, the adjoined anchorage 7 includes a socket face 39 that internally has a sliding bearing 15 in which is housed the innermost end 37.

The sliding bearing 15 has a linear translation axis LT along which the innermost end 37 is slidably guided relative to the adjoined anchorage 7 to have one degree of freedom along the linear translation axis LT.

Figure 9:
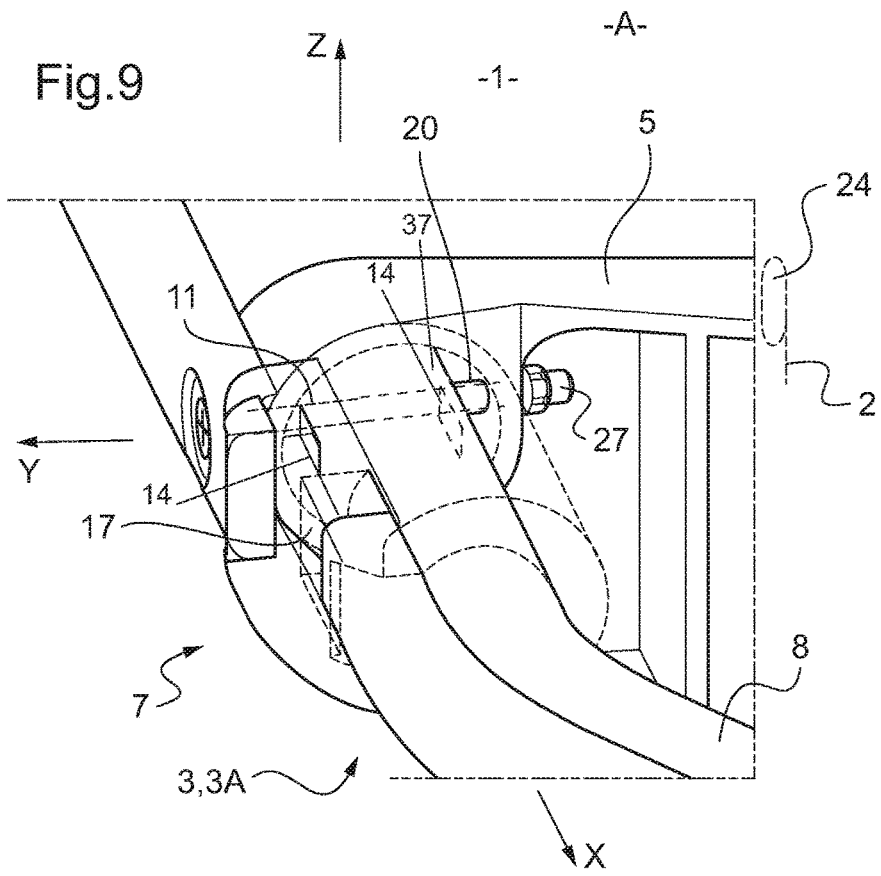
FIG. 9 is a perspective front and lateral view of an adjoined anchorage when assembled to a deflector ramp and to a protuberant body step.

On FIG. 9 for instance, the innermost end 37 has a slot hole 14 extended along the linear translation axis LT. The adjoined anchorage 7 has a traversing bore 20 radially passing from the sliding bearing 15 to an adjunctive arrangement 27 outside the socket face 39. The adjunctive arrangement 27 is able to complementary fit into the support sheath 12 of the protuberant body 1. The deflector assembly 3A includes a binding axis 11 passing through the slot hole 14 and through the traversing bore 20, so that the binding axis 11 is able to be rigidly secured in a drill hole 18 of the support sheath 12, for having the adjoined anchorage 7 fixedly hold into the support sheath 12 and the innermost end 37 slidably guided along the linear translation axis LT.

As shown on FIG. 4, the slot hole 14 has a predetermined dimension VLT along the linear translation axis LT that correspondingly limits the freedom in translation of the innermost end 37 of the deflector assembly 3 (here the front assembly 3A), relative to the adjoined anchorage 7. Each support sheath 12 has a drill hole 18 facing both the slot hole 14 and the traversing bore 20.

On FIG. 4, the linear translation axis LT of the sliding bearing 15 is parallel to the longitudinal direction X. Other embodiments allows distinct linear translation axis, e.g. along he transverse direction Y or with acute angles relative to one of these directions X or Y. Most embodiments provide for linear translation axis LT in a plane transverse to the anteroposterior plane XY and parallel to the longitudinal direction X.

On FIG. 3, the adjoined anchorage 7 has an outer recess 17 in the socket face 39 and a front beam 4. The front beam 4 is received into the outer recess 17 flush with the socket face 39. The front beam 4 is arranged to be able to locally cover the support sheath 12 and a step plate 10 of the protuberant body 1, so that the front beam 4 is outwardly leveled with the socket face 39.

On FIGS. 4-6, the socket face 39 has a pair of rounded frontages 40A-40B, respectively fore and aft. This socket face 39 is a one-piece member made of a single material chosen among one of: die cast metal, machined metal, machined synthetic resin, molded synthetic resin, unitary formed composite.

Since such a socket face 39 is one-piece, the sliding bearing 15 is either formed from mold casting and/or machined.

In the deflector assembly 3A of FIGS. 3-4, a frontage cam track 9 is fixedly secured to the deflector ramp 8 and is locally covering both the central oblique section 38 and the innermost end 37 of the deflector ramp 8. In this embodiment, the cam track 9 extends all along the deflector ramp 8 from fore to aft, but only partially covers radially this ramp 8.

On FIGS. 4-6, the socket face 39 has a clearance cavity 16 extending along the linear translation axis LT for receiving an end portion of the frontage cam track 9 aside the innermost end 37.

The end portion of the frontage cam track 9 is locally housed freely into the clearance cavity 16, so that when the deflector ramp 8 translates relative to the socket face 39, the ending portion of the frontage cam track 9 respectively slides inside the clearance cavity 16. Such efforts and vibrations are therefore not transferred to the fuselage 2. This allows releasing efforts and vibrations that would otherwise possibly impair the aircraft 1.

As shown on FIG. 3, the deflector ramp 8 has a tube shaped section, integrally formed with the innermost end 37 that is parallel with the linear translation axis LT, with the central oblique section 38 extending with the oblique angle SG and with the outermost end 36 parallel with the linear translation axis LT. The tube shaped section forming a one-piece deflector ramp 8.

The example on FIG. 3 of the oblique angle SG is an acute angle. Other embodiments provide for an oblique angle SG is an open angle.

On FIG. 7, the remote deflector anchorage 6 includes in the support bracket 21 a rotational bushing 21A, so that the outermost end 36 is pivotably secured to the fuselage 2, with a relative degree of rotational freedom. So, efforts and vibrations are therefore not transferred to the fuselage 2. This allows releasing efforts and vibrations that would otherwise possibly impair the aircraft 1.

Should the aircraft A include one or more deflector assemblies 3, 3A or 3B for at least one protuberant body 1, the invention has the advantage that each deflector assembly 3, 3A or 3B is very easily mounted and demounted compared with known solutions. Therefore aerodynamic drag can be reduced during service, if the aircraft A don't has to perform a mission involving a hoist H, e.g. a SAR-mission.

Besides, the invention allows movement of the deflector assembly 3, 3A or 3B in the flight direction X at the adjoined anchorage 7 and rotational freedom at the remote anchorage 6, to prevent high loads from occurring between the deflector assemblies 3, 3A or 3B and the corresponding protuberant body 1.

Therefore a lighter design of the protuberant body 1 can be performed. During flight, the incurred movements of the protuberant body 1 relative to areas of the fuselage 2 are not resulting in altering forces, since the deflector assemblies 3, 3A or 3B is not rigidly fixed to the protuberant body 1 and to the aircraft A.

For production standpoint, the invention involves only a few parts and is very cost effective based on the use of semi-finished products like tubes.

The deflector assemblies 3, 3A or 3B prevent the rope R from uncontrolled jamming within all the possible rope positions during service.

Thanks to the invention, the protuberant body 1 forms a boarding step that consists only of a beam and two mount devices 5 riveted or screwed together. The mount devices 5 are simply connected to the aircraft A outer skin via the attachments 24A-24B. On each side of the boarding step 1 is possibly arranged one deflector assembly 3, 3A or 3B.

Each of the deflector assemblies 3, 3A or 3B is attached to the aircraft A outer skin by a bracket and a screw. The mount devices 5 have each on one side a drill hole 18, in which a slide bearing 15 is located. The slide bearing 15 is part of the sleeve formed by the sheath 12. In this sleeve, the tube forming the ramp 8 is located.

The drill hole 18 runs through the edge of the deflector assemblies 3, 3A or 3B, the support sleeve, the mount, the tube and the deflector sleeve. In this drill hole 18 there is a screw placed and connected with a nut to form the adjoined anchorage 27. Thereby the screw prevents the sleeve from sliding out of the drill hole 18.

Because the slide bearing 15 and the surfaces of the deflector assembly 3, 3A, 3B are part of the deflector sleeve, the surfaces of the deflector assemblies are thus located relative to the boarding step forming the body 1.

Each of the deflector assemblies 3, 3A or 3B is mainly composed of a tube and a deflector edge, being riveted or screwed together. It is also possible, that the tube solely acts as a rope deflector without a separated deflector edge, i.e. without the frontage cam track 9.

The deflector edge is riveted or screwed to the beam. The deflector edge is connected to the mount with the screw. The deflector edge, the deflector sleeve and the deflector edge consist preferably of plastics and are the sacrifice friction partner when in contact with the rescue hoist rope R. Therefore the support sleeve favorably consisting of metal is placed in the screw force closure of screw to prevent soft material from being in the screw force closure and therefore the screw preload from vanishing due to embedding and relaxation.

Therefore in between the deflector edge and the support sleeve 19 there is a predetermined clearance in screw direction, whereas the support sleeve lays flush on the mount device 5.

The tube of the deflector ramp 8 has a slot hole resulting in the tube's movability in the tube's axial degree of freedom, but it is fixed in the other degrees of freedom.

The slot hole enables an axial movement of the deflector ramp 8 up to the stop given by the screw with the slot hole. It is also conceivable that on one side of the body 1, the slot hole is replaced by a simple hole in order to selectively ensure the axial movability only on one side of the body 1.

The deflector sleeve has a groove to house the deflector edge and a groove to house the deflector edge with predetermined clearances. The contact surfaces with the rope of the deflector edges and are mainly vertically oriented. Accordingly the deflector contour at the deflector sleeve's transition to the deflector edge and has roundness's, whose axes are mainly oriented vertically.

Therefore a transition between the deflector edge and the deflector sleeve through the deflector sleeve is realized, which enables the rescue rope R to ride easily over the deflector.

The rope deflector is easily mountable and demountable by the use of only two screws.

The following table T1 is listing the references signs in the drawings.

| | |
|---|---|
| 1 | protuberant body |
| 2 | fuselage |
| 3 | deflector assembly-3A/3B |
| 4 | front beam |
| 5 | mount device |
| 6 | remote anchorage |
| 7 | adjoined anchorage |
| 8 | deflector ramp |
| 9 | frontage cam track |
| 10 | step plate |
| 11 | binding axe |
| 12 | support sheath |
| 13 | nut |
| 14 | slot hole |
| 15 | sliding bearing |
| 16 | clearance cavity |
| 17 | outer recess |
| 18 | drill hole |
| 19 | deflector sleeve |
| 20 | traversing bore |
| 21 | support bracket |
| 22 | hanging cone (30°) |
| 23 | suspension point |
| 24A-24B | attachment organs |
| 25 | first side end |
| 26 | second side end |
| 27 | adjoined anchorage |
| 35 | adjunctive arrangement |
| 36 | outermost end |
| 37 | innermost end |
| 38 | central oblique section |
| 39 | socket face |
| 40A-40B | rounded frontage |
| A | Aircraft |
| ER | External item |
| R | Rope/cable |
| X | longitudinal direction |
| Y | transverse direction |
| Z | upright direction |
| XZ | anteroposterior plane |
| LT | linear translation axis |
| SG | oblique angle |
| VLT | predetermined dimension |

The invention may be subjected to variations as to its implementation, said variations not being possibly identified exhaustively.

What is claimed is:

1. A deflector assembly for an aircraft, the deflector assembly for mounting on a fuselage of the aircraft (A) so as to protect a protuberant body against contact adverse reaction from an external item (ER) outside the fuselage, the protuberant body mounted on and extending outwards from the fuselage, the deflector assembly comprising at least:
   one adjoined anchorage for rigidly securing to the protuberant body,
   one remote anchorage for securing to the fuselage, and
   one deflector ramp extending from the adjoined anchorage and towards the remote anchorage along a longitudinal direction (X) of the deflector assembly, wherein an innermost end of the deflector ramp cooperates with the adjoined anchorage and an outermost end of the deflector ramp cooperates with the remote anchorage, the deflector ramp having a central oblique section that extends along an axis that is intersecting a longitudinal direction (X) of the deflector assembly and extends with an oblique angle (SG) relative to the longitudinal direction (X), to act as a sliding guide for the external item (ER),
   wherein the adjoined anchorage includes a socket face that internally has a sliding bearing in which is housed the innermost end, the sliding bearing having a linear translation axis (LT) along which the innermost end of the deflector ramp is slidably guided relative to the adjoined anchorage to have one translational degree of freedom along the linear translation axis (LT) after the deflector ramp is connected to the adjoined anchorage, wherein the remote anchorage has a support bracket for demountably mounting the remote anchorage to the fuselage;

wherein a frontage cam track is fixedly secured to the deflector ramp and is locally covering the central oblique section and partly the innermost end of the deflector ramp; and wherein the socket face has a clearance cavity extending along the linear translation axis (LT) for receiving an end portion of the frontage cam track aside the innermost end, the end portion of the frontage cam track being locally housed freely into the clearance cavity, so that when the deflector ramp translates relative to the socket face, the ending portion of the frontage cam track respectively slides inside the clearance cavity.

2. The deflector assembly of claim 1, wherein the innermost end has a slot hole extended along the linear translation axis (LT), wherein the adjoined anchorage has a traversing bore radially passing from the sliding bearing to an adjunctive arrangement outside the socket face, the adjunctive arrangement complementary fitting into a support sheath of the protuberant body, and wherein the deflector assembly includes a binding axis passing through the slot hole and through the traversing bore, the binding axis for rigidly securement in a drill hole of the support sheath such that the adjoined anchorage fixedly holds into the support sheath and the innermost end is slidably guided in translation along the linear translation axis (LT).

3. The deflector assembly of claim 1, wherein the innermost end has a slot hole extended along the linear translation axis (LT), and wherein the slot hole has a predetermined dimension (VLT) along the linear translation axis (LT) that correspondingly limits the freedom in translation of the innermost end relative to the adjoined anchorage.

4. The deflector assembly of claim 1, wherein the linear translation axis (LT) of the sliding bearing is parallel to the longitudinal direction (X).

5. The deflector assembly of claim 1, wherein the adjoined anchorage has an outer recess in the socket face and a front beam, the front beam received into the outer recess flush with the socket face, the front beam arranged to locally cover a support sheath and a step plate of the protuberant body, so that the front beam is outwardly leveled with the socket face.

6. The deflector assembly of claim 1, wherein the socket face has at least one rounded frontage and is a one-piece member made of a single material chosen among one of: die cast metal, machined metal, machined synthetic resin, molded synthetic resin, unitary formed composite.

7. The deflector assembly of claim 1, wherein the deflector ramp has a tube shaped section, integrally formed with the innermost end parallel with the linear translation axis (LT), and wherein the central oblique section extending with the oblique angle (SG) is an acute angle and the outermost end parallel with the linear translation axis (LT).

8. The deflector assembly of claim 1, wherein the remote anchorage includes in the support bracket a rotational bushing, so that the outermost end is pivotably secured to the fuselage, with a relative degree of rotational freedom.

9. An aircraft (A) wherein the aircraft (A) includes at least one deflector assembly according to claim 1 and at least one protuberant body.

10. The aircraft of claim 9, wherein at least one protuberant body has attached thereto, two deflector assemblies, one deflector assembly arranged besides a first side end of the protuberant body and another deflector assembly arranged besides a second side end of the protuberant body.

11. The aircraft (A) of claim 9, wherein the at least one protuberant body has a mount device including at least one support sheath able to cooperate with the deflector assembly and one attachment organ through which the protuberant body is demountably mounted on the fuselage; and wherein the support sheath has a drill hole facing a slot hole and a traversing bore.

12. The aircraft (A) of claim 9, wherein the at least one protuberant body is extended parallel to an anteroposterior plane (XZ) of the aircraft (A), wherein the deflector assembly is a heading deflector assembly and has the linear translation axis (LT) extending parallel the anteroposterior plane (XZ), wherein the oblique section of the deflector ramp is transverse to the anteroposterior plane (XZ), towards the anteroposterior plane (XZ) longitudinally from aft to fore along a forward cruise axis of the aircraft (A).

13. The aircraft (A) of claim 9, wherein the at least one deflector assembly is located under a movable panel of the fuselage and in overhanging concordance with a suspension point of the fuselage to which the external item (ER) hangs over, and wherein the at least one deflector assembly is aside of the suspension point along a forward cruise axis of the aircraft (A).

14. The aircraft (A) of claim 9, wherein the aircraft (A) is a rotorcraft and, wherein the longitudinal direction (X) of the at least one deflector assembly is chosen to extend along one of: a cruise forward axis of the aircraft (A) and a transverse axis orthogonal to the cruise forward axis of the aircraft (A) and to a anteposterior plane (XZ) of the aircraft (A).

15. A deflector assembly for an aircraft comprising:

an adjoined anchorage for rigidly securing to a protuberant body mounted to and extending outwardly from a fuselage of the aircraft, the adjoined anchorage with a socket face having internally a sliding bearing, wherein the adjoined anchorage defines a traversing bore extending transversely through the sliding bearing;

a remote anchorage with a support bracket for demountably mounting the remote anchorage to the fuselage; and a deflector ramp for protecting the protuberant body against contact adverse reaction from an external item (ER) outside the fuselage, and having a central oblique section positioned between an innermost end and an outermost end, the innermost end connected to the adjoined anchorage and supported by the sliding bearing such that the innermost end is slidably guided relative to the adjoined anchorage with one translational degree of freedom along a linear translation axis (LT) of the sliding bearing after the deflector ramp is connected to the adjoined anchorage, the outermost end connected to the remote anchorage, wherein the outermost end of the deflector ramp is supported for pivotal movement relative to the fuselage by the support bracket, wherein the deflector ramp extends along a longitudinal direction (X) of the deflector assembly from the adjoined anchorage to the remote anchorage, wherein the central oblique section extends along an axis intersecting the longitudinal direction (X) and at an oblique angle (SG) relative to the longitudinal direction (X) to act as a sliding guide for the external item (ER), and wherein the innermost and outermost ends of the deflector ramp each extend in parallel with the linear translation axis (LT);

wherein the innermost end of the deflector ramp defines a slot hole elongated along the linear translation axis (LT); and wherein the deflector assembly further comprises a binding axis extending through the slot hole and the traversing bore to fix the adjoined anchorage relative to the protuberant body while allowing translational movement of the deflector ramp relative to the adjoined anchorage and protuberant body along the linear translation axis (LT).

16. An aircraft comprising:

a fuselage having a suspension point for an external item (ER);

a protuberant body mounted to and extending outwardly from the fuselage; and a deflector assembly for protecting the protuberant body against contact adverse reaction from the external item (ER) outside the fuselage, the deflector assembly comprising:

an adjoined anchorage connected to the protuberant body, the adjoined anchorage with a socket face having internally a sliding bearing, wherein the adjoined anchorage defines a traversing bore extending transversely through the sliding bearing, a remote anchorage demountably mounted to the fuselage via a support bracket, a deflector ramp having a central oblique section positioned between an innermost end and an outermost end, the innermost end connected to the adjoined anchorage and supported by the sliding bearing such that the innermost end is slidably guided relative to the adjoined anchorage with one translational degree of freedom along a linear translation axis (LT) of the sliding bearing after the deflector ramp is connected to the adjoined anchorage, the outermost end connected to the remote anchorage, wherein the innermost end of the deflector ramp defines a slot hole elongated along the linear translation axis (LT), wherein the outermost end of the deflector ramp is supported for pivotal movement relative to the fuselage by the support bracket, and wherein the deflector ramp extends along a longitudinal direction (X) of the deflector assembly from the adjoined anchorage to the remote anchorage, wherein the central oblique section extends along an axis intersecting the longitudinal direction (X) and at an oblique angle relative to the longitudinal direction (X) to act as a sliding guide for the external item (ER), and a binding axis extending through the slot hole and the traversing bore to fix the adjoined anchorage relative to the protuberant body while allowing movement of the deflector ramp relative to the adjoined anchorage and protuberant body along the linear translation axis (LT).

* * * * *